(12) United States Patent
Ruthinowski

(10) Patent No.: US 9,493,099 B2
(45) Date of Patent: Nov. 15, 2016

(54) MOVABLE INSERTS FOR CONCEALING CHILD SAFETY SEAT ANCHORS IN A VEHICLE

(71) Applicant: Ford Global Technologies, LLC, Dearborn, MI (US)

(72) Inventor: Richard Edward Ruthinowski, Taylor, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 14/640,306

(22) Filed: Mar. 6, 2015

(65) Prior Publication Data

US 2016/0257229 A1 Sep. 8, 2016

(51) Int. Cl.
*B60N 2/26* (2006.01)
*B60N 2/28* (2006.01)
*B60N 2/58* (2006.01)

(52) U.S. Cl.
CPC ............. *B60N 2/5833* (2013.01); *B60N 2/28* (2013.01)

(58) Field of Classification Search
CPC ............................... B60N 2/28; B60N 2/5833
USPC .................................................. 297/253, 481
See application file for complete search history.

(56) References Cited

U.S. PATENT DOCUMENTS

| | | | | |
|---|---|---|---|---|
| 4,662,676 A * | 5/1987 | Havelock | ............... | A47C 7/70 108/26 |
| 4,674,795 A * | 6/1987 | Nelson | ............... | A47C 3/023 297/239 |
| 5,249,839 A * | 10/1993 | Faiks | ............... | A47C 1/03255 297/284.4 |
| 5,829,828 A * | 11/1998 | Asfaw | ............... | A47C 31/11 297/253 X |
| 6,394,552 B1 * | 5/2002 | Su | ............... | A47C 7/40 297/410 |
| 6,416,128 B1 * | 7/2002 | Fujii | ............... | B60N 2/2893 297/253 X |
| 6,582,016 B1 * | 6/2003 | Kirchoff | ............... | B60N 2/286 297/253 |
| 6,601,523 B2 * | 8/2003 | Jensen | ............... | B60N 3/004 108/152 |
| 6,601,917 B1 | 8/2003 | Christopherson | | |
| 7,093,896 B2 * | 8/2006 | Morita | ............... | B60N 2/2821 297/253 |
| 7,281,763 B1 | 10/2007 | Hayashi et al. | | |
| 7,427,103 B2 * | 9/2008 | Weber | ............... | B60N 2/2893 297/253 X |
| 7,699,396 B2 | 4/2010 | Ghisoni et al. | | |
| 7,722,105 B2 | 5/2010 | Shellhammer | | |
| 7,758,096 B2 | 7/2010 | Ohta | | |
| 8,328,280 B2 * | 12/2012 | Parker | ............... | B60N 2/2887 297/253 X |

(Continued)

*Primary Examiner* — Rodney B White
(74) *Attorney, Agent, or Firm* — LeClairRyan

(57) ABSTRACT

A method and apparatus for concealing the CRS anchor of a vehicle when not in use and exposing the anchor when CRS attachment is required. The inventive concept disclosed herein provides the use of concealing seat trim that can be removed, slid, or rotated to reveal the CRS anchor. The disclosed system provides accessibility and finger and hand clearance to the anchor. The anchor concealing trim piece of the disclosed inventive concept may be small and individual, one for each affected anchor, or may be a single insert that spans the distance between multiple anchors. The size of the anchor concealing trim piece can vary based on anchor location and styling as well as on how much additional accessibility is desired. The anchor concealing trim pieces may be held in their concealing position in a pocket formed in the seat by hook-and-loop fasteners or CRS web strap and clips fastened to a wire frame.

20 Claims, 15 Drawing Sheets

(56) References Cited

U.S. PATENT DOCUMENTS

| | | |
|---|---|---|
| 8,678,497 B2 | 3/2014 | Kyogoku et al. |
| 8,740,309 B2 * | 6/2014 | Kajihara .................. B60N 2/58 297/452.38 |
| 8,789,868 B1 * | 7/2014 | Sachs ........................ B60R 5/04 224/314 |
| 8,801,073 B1 * | 8/2014 | Gray, Jr. .................. B60R 7/02 224/314 |
| 2002/0104190 A1 | 8/2002 | Moore et al. |
| 2004/0066074 A1 * | 4/2004 | Ovitt ........................ A47C 3/18 297/344.21 |
| 2006/0261650 A1 * | 11/2006 | Billman ................... B60N 2/28 297/250.1 |
| 2006/0261651 A1 * | 11/2006 | Nolan .................. B60N 2/2806 297/250.1 |
| 2012/0032490 A1 * | 2/2012 | Nowak ................... B62B 9/102 297/423.3 |
| 2014/0028067 A1 * | 1/2014 | Wan ........................ A47C 7/024 297/312 |

* cited by examiner

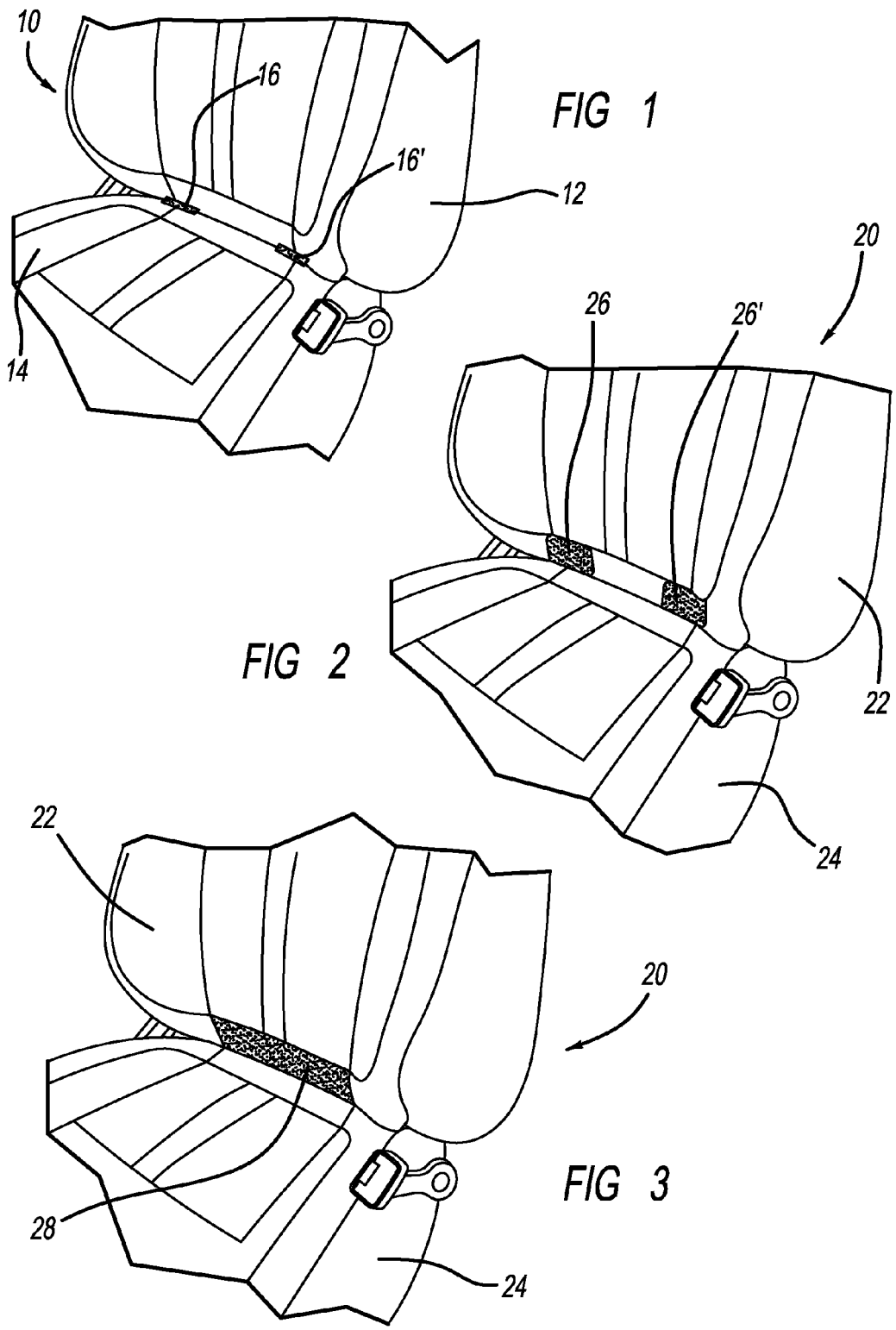

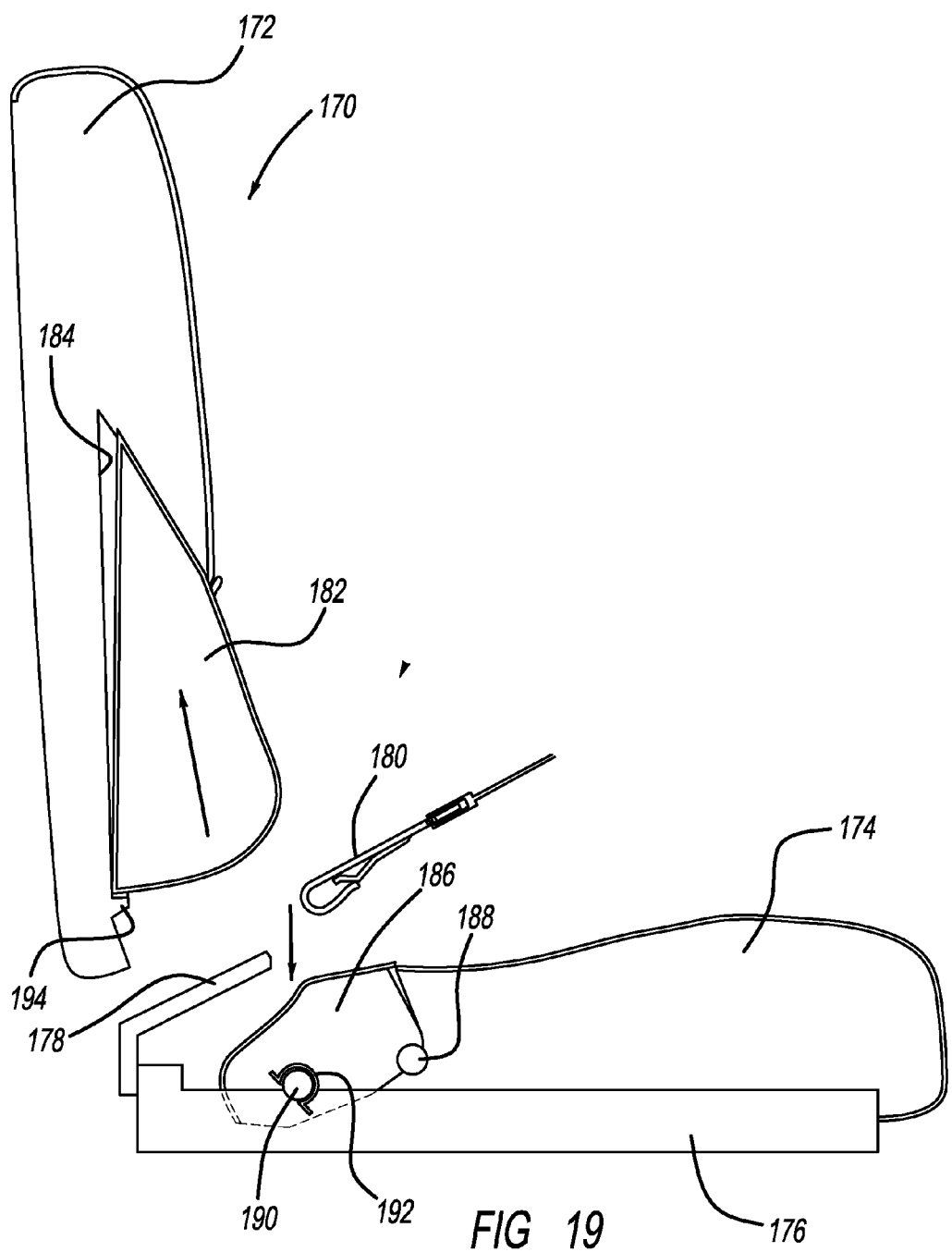

MOVABLE INSERTS FOR CONCEALING CHILD SAFETY SEAT ANCHORS IN A VEHICLE

TECHNICAL FIELD

The disclosed inventive concept relates generally to vehicle seats and safety systems. More particularly, the disclosed inventive concept relates to a method and system for concealing child safety seat anchors when not in use by the provision of one or more selectively removable inserts.

BACKGROUND OF THE INVENTION

Various state and federal rules and guidelines specify that children of certain ages should be seated in Child Restraint Systems (CRS) or in a booster seat. For example, the National Highway Traffic Safety Administration recommends that children from birth to three years old be positioned in a rear-facing car seat, while children between the ages of one year to seven years be seated in a forward-facing car seat. Booster seats are recommended for children between the ages of four and 12 years. Age variations for these recommendations are due to such factors as height and weight for the individual child.

As a consequence of such safety standards, today's vehicle includes CRS anchors strategically located on one or more of the vehicle's seats. Such anchors are typically positioned in such a way so as to minimize intrusion into the aesthetics of the vehicle interior. As a consequence, rear seat (or lower) CRS anchors are commonly difficult to directly see or access without applying force to compress or displace vehicle seat foam to expose anchors. Thus it can be difficult for consumers to access the anchors to install or remove child seats in the rear seat of a vehicle. The zone-driven location of the anchors in which the position sometimes may additionally be affected by both comfort and styling can lead to a small zone of acceptable anchor placement which is not necessarily ideal for consumer access.

In addition, when anchors are recessed under or behind vehicle seat foam, more effort is needed by the consumer to install the CRS. For example, it can be difficult to attach and detach CRS web strap hooks that engage the anchors for tensioning the child seat to the vehicle seat, compared to an environment in which an anchorage is readily accessible, protruding from the vehicle seat foam or trim. It can be especially difficult to detach a tensioned anchor with limited finger clearance, visibility and a CRS tensioned close to the area of limited accessibility.

Thus today's vehicle designers are challenged to enhance the ease of CRS installation which would, as a consequence, improve compliance with proper seat installation. The solution for improving accessibility to lower child restraint anchorages for parents without affecting seating comfort or anchor performance must be cost-efficient and simple while enhancing customer satisfaction. Importantly, such a solution must aid in overcoming the reality that many CRS are often incorrectly installed and positioned in vehicles.

A simple and consumer-friendly solution to balancing the need for consumer access to CRS anchors with the need for maintaining a vehicle interior design that is free of unattractive functional elements is desired.

SUMMARY OF THE INVENTION

The disclosed inventive concept provides a solution to the need for concealing CRS anchors while simultaneously making them readily accessible to the consumer. The inventive concept disclosed herein provides the use of concealing seat trim that can be removed, slid, or rotated to reveal the CRS anchor. Such a system fully satisfies the need to provide easy access to the CRS anchor while fully and aesthetically concealing the anchor when not in use.

The disclosed inventive concept provides a small trimmed section of seat foam that is removable, slidable or rotatable to simply reveal the CRS anchor while also providing a substantial improvement in accessibility, finger and hand clearance to the in-zone, fixed position CRS anchor. The disclosed inventive concept reduces the complexity, installation and removal efforts experienced by the consumer.

The concealing trim foam pieces of the disclosed inventive concept may be small and individual, one for each affected anchor, or may be a single insert that spans the distance between a pair or set of anchors. The size of the anchor concealing trim piece can vary based on anchor location and styling as well as on how much additional accessibility is desired.

The anchor concealing trim pieces may be held in their concealing position in a number of ways. For example, the trim pieces may be secured to the seat by hook-and-loop fasteners in a pocket in the lower portion of the primary seatback or a rear portion of primary seat cushion. Alternatively, the trim pieces may be snapped or CRS web strap and clipped into position by a simple c-CRS web strap and clip, j-CRS web strap and clip, or other fastener that provides the same function for attachment to a retention member disposed within the seat foam or seat structure. For example, an existing rod or wire-like support member found within many rear seat cushions or seatback frame structures. If such a member is not already present, a relatively simple reshaping in the design phase could provide the needed access points. Alternatively, a small interfacing member could be inserted into the primary cushion foam mold and become a local attachment point to which the rotatable, removable or slidable anchor concealing trim piece could be positively located.

It should also be noted the relationship could be reversed where a CRS web strap and clip-like feature is provided in the primary seat base or back cushion and an interfacing feature like a wire, rod or other feature providing the same function is molded into the secondary insert piece of foam or trim covering the anchorages. These principles could also be applied to top tether anchorages, in certain circumstances, if so desired.

The disclosed inventive concept overcomes the problems of known arrangements. Particularly, use of the disclosed inventive concept requires no detectable impact on styling, function, comfort, appearance, interior spaciousness, vehicle weight or cost. No actuator or release mechanisms are required as the anchors remain in their fixed zone positions. By providing a system in which the anchors are simply revealed by movement of the anchor concealing trim piece, a wide range of possible visibility and accessibility enhancements are made to provide ease with which a consumer can attach or detach a CRS to vehicle anchors. Variations of the disclosed inventive concept include providing a mechanism for automated movement of the anchor concealing trim piece between its anchor-concealing position and its anchor-exposing position.

Use of the disclosed inventive concept will improve consumer compliance with proper CRS attachment through ease of access to the CRS anchor, thus significantly reducing incorrect attachment to the anchor. The design, content, validation, misuse, and end-user complexity are all minimized by the disclosed inventive concept. Multiple optional considerations are described herein where existing vehicle seat hardware can provide dual functionality, providing interfacing surfaces to which the trim/foam segments shown can be attached to or removed from.

The above advantages and other advantages and features will be readily apparent from the following detailed description of the preferred embodiments when taken in connection with the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention wherein:

FIG. 1 is a perspective view of a portion of a vehicle seat having CRS anchors;

FIG. 2 is a perspective view of a portion of a vehicle seat in which the approximate locations of needed accessibility are required in the seat back;

FIG. 3 is a perspective view of a portion of a vehicle seat in which an approximate location of needed accessibility is required in the seat back;

FIG. 15 is a perspective view of the rotatable anchor concealing trim piece of the vehicle seat embodiment illustrated in FIG. 14;

FIG. 19 is a view similar to that of FIG. 18 except the slidable anchor concealing trim piece is shown moved to its anchor exposing position.

DETAILED DESCRIPTION OF THE PREFERRED EMBODIMENT

Figure 4:
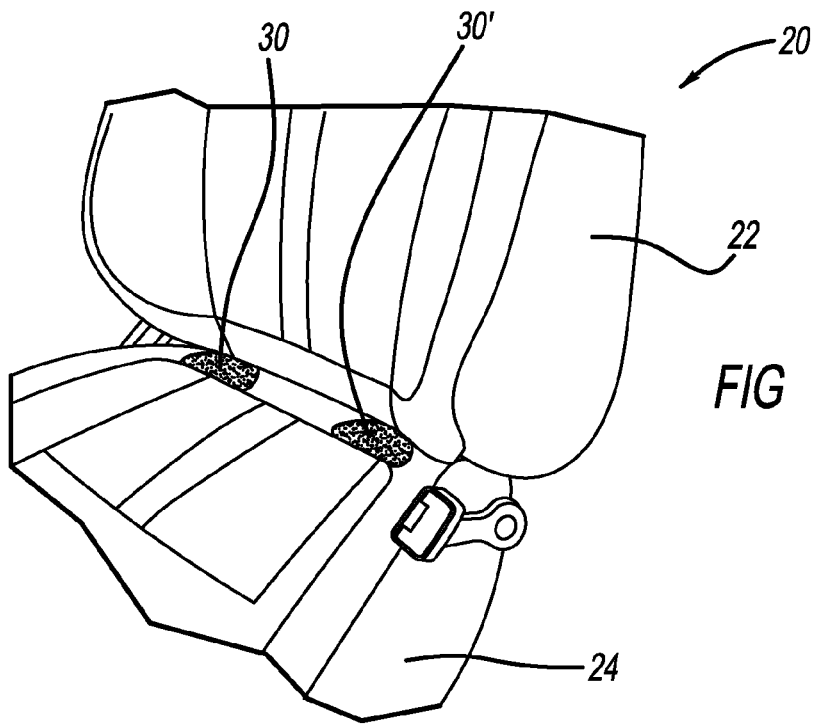
FIG. 4 is a perspective view of a portion of a vehicle seat in which the approximate locations of needed accessibility are required in the seat base.

In the following figures, the same reference numerals will be used to refer to the same components. In the following description, various operating parameters and components are described for different constructed embodiments. These specific parameters and components are included as examples and are not meant to be limiting.

Referring to FIG. 1, a perspective view of a portion of a vehicle seat is shown and is generally illustrated as 10. The vehicle seat 10 includes a seat back 12 and a seat base 14. CRS anchors 16 and 16' are shown generally positioned at the area where the seat back 12 and the seat base 14 meet, as illustrated. A greater or lesser number of CRS anchors may be provided as is known in the art.

While FIG. 1 illustrates known locations of CRS anchors, attachment areas vary from vehicle seat to vehicle seat. Non-limiting examples of anchor accessibility locations are illustrated in FIGS. 2 through 5. Referring to these figures, a perspective view of a portion of a vehicle seat is shown and is generally illustrated as 20. The vehicle seat 20 includes a seat back 22 and a seat base 24.

In FIG. 2, access locations 26 and 26' are illustrated in the lower portion of the seat back 22. In this configuration, it is desired to position a anchor concealing trim piece over each of the access locations 26 and 26'.

In FIG. 3, an elongated access location 28 is illustrated, also in the lower portion of the seat back 22. In this configuration, it is desired to position a single, elongated anchor concealing trim piece over the entire access location 28.

In FIG. 4, access locations 30 and 30' are illustrated in the rearward portion of the seat base 24. In this configuration, it is desired to position an anchor concealing trim piece over each of the access locations 30 and 30'.

Figure 5:
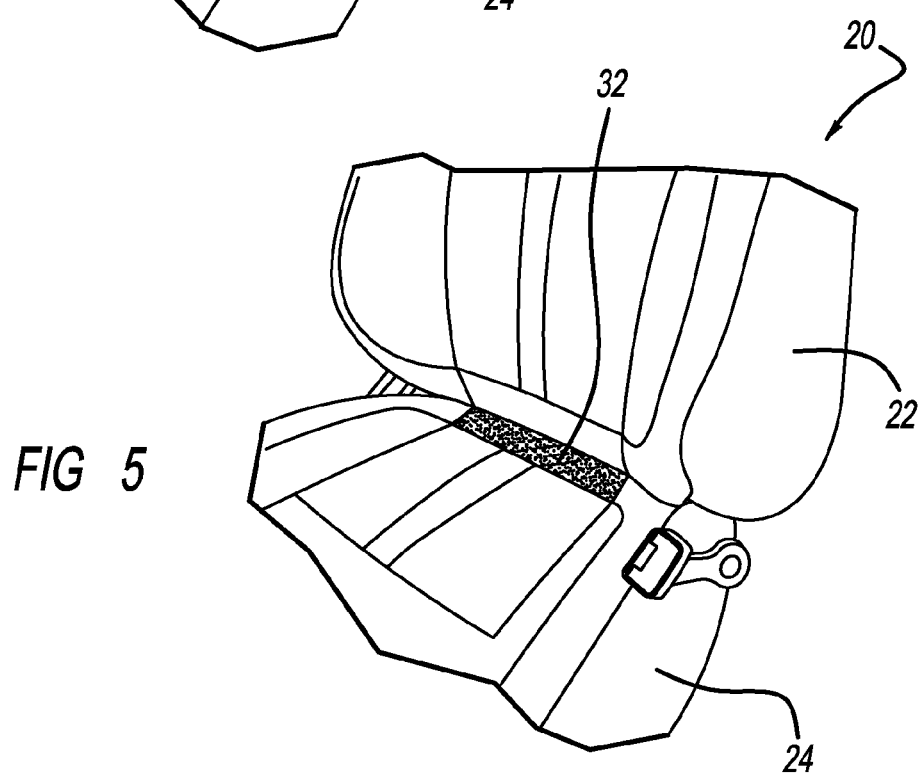
FIG. 5 is a perspective view of a portion of a vehicle seat in which an approximate location of needed accessibility is required in the seat base.

In FIG. 5, an elongated access location 32 is illustrated, also in the rearward portion of the seat base 24. In this configuration, it is desired to position a single, elongated anchor concealing trim piece over the entire access location 32.

The access locations shown in FIGS. 2 through 5 are suggestive only and are not intended as being limiting. It is to be understood that other locations may exist in either or both of the vehicle seat back 22 or the vehicle seat base 24.

The disclosed inventive concept includes removable, slidable or rotatable anchor concealing trim pieces as will be described below. An advantage of the disclosed inventive concept is that it may be incorporated into existing vehicle seats with the least amount of modification, and thus the least amount of expense. For example, attachment of the anchor concealing trim piece to the vehicle seat may be made by using existing seat structures, as illustrated in FIGS. 6 and 7.

Figure 6:
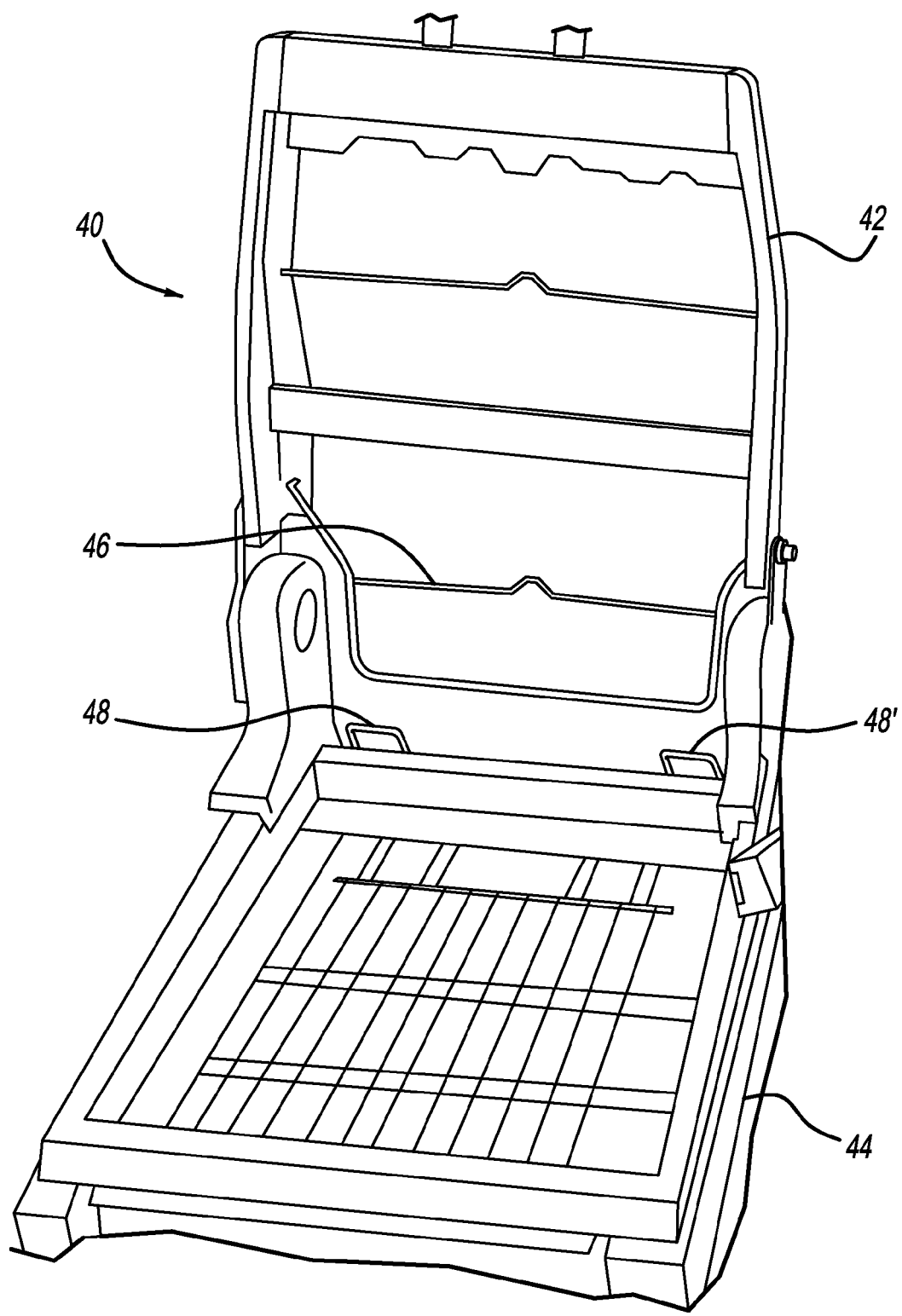
FIG. 6 is a front view of a vehicle seat shown without the seat back pad and the seat base pad to illustrate the wireframe rod available for attachment of the anchor concealing trim piece according to the disclosed inventive concept.
Figure 7:
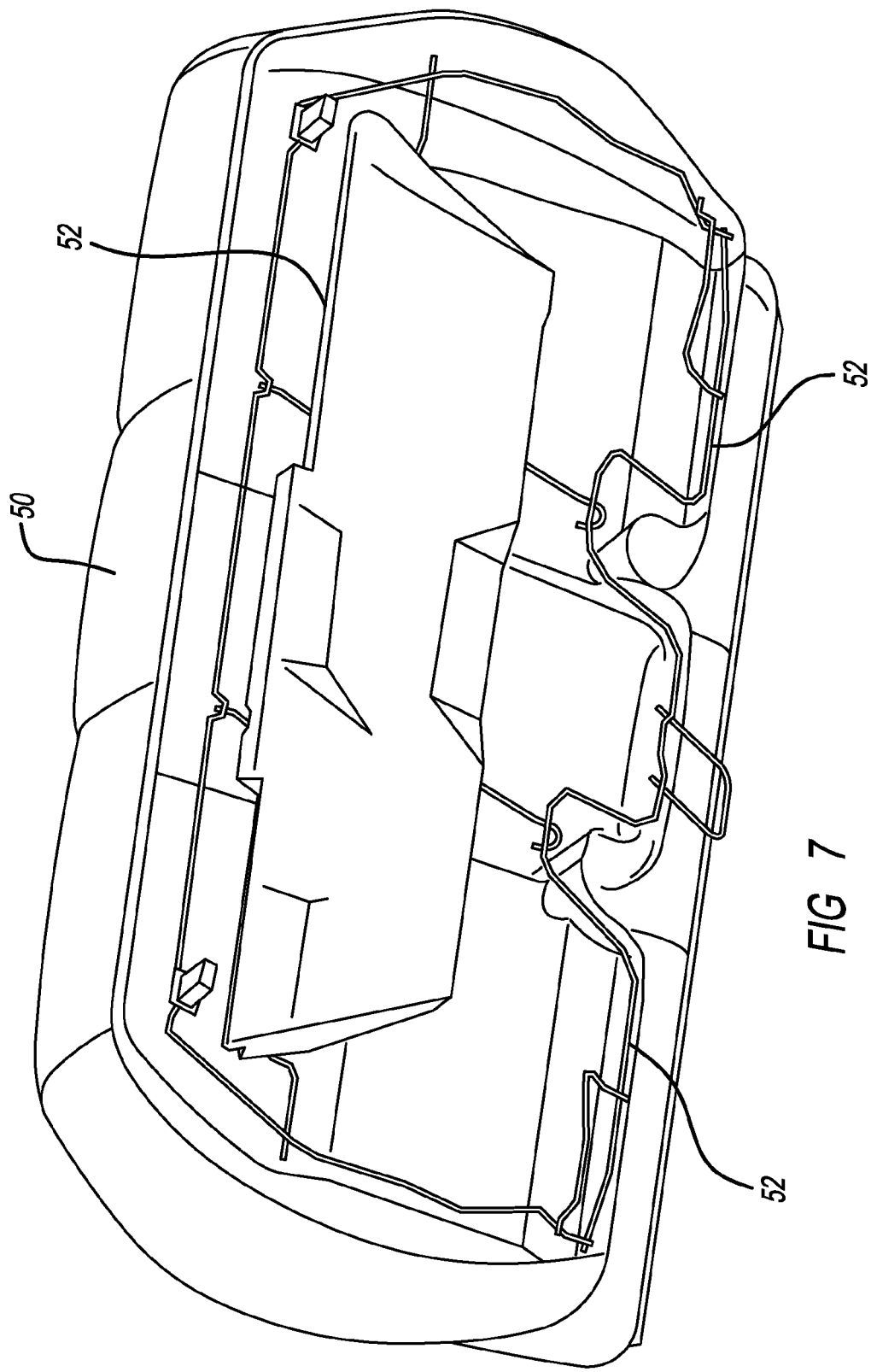
FIG. 7 is a perspective view of the underside of a vehicle bench seat pad illustrating the wireframe rod available for attachment of the anchor concealing trim piece according to the disclosed inventive concept.

Referring to FIG. 6, a vehicle seat 40 is generally illustrated having a seat back 42 and a seat base 44. A wireframe rod, such as wireframe rod 46, is conventionally provided in the seat back 42. The wireframe rod 46 is separate from the cushion foam and is usable as an attachment point for the concealing trim piece. A pair of CRS anchors 48 and 48' is provided.

As the wireframe rod 46 (or some variation thereof) is conventionally provided as part of the vehicle seat 40, the disclosed inventive concept avoids the need to add new content to achieve attachment. The wireframe rod 46 is conveniently and favorably located directly above the CRS anchors 48 and 48'.

The provision of wireframe rods in the existing vehicle seat is not limited to the seat back of the vehicle seat. As illustrated in FIG. 7, the wireframe rod may also be provided in the seat base of the vehicle seat. Particularly, the underside of a seat base 50. The seat base 50 typically includes a skeletal wireframe 52 that may be used for convenient attachment of the concealing trim piece.

The concealing trim pieces of the disclosed inventive concept that may be used in conjunction with the seats are shown in various configurations and arrangements in FIGS. 8 through 19. The concealing trim pieces may be composed of a variety of materials, though conventional polyurethane foam is the material of choice. The heights, lengths, widths, depths and locations of the concealing trim piece can be varied to achieve the desired balance of anchor accessibility or visibility as well as styling and comfort. Thus the illustrated concealing trim pieces shown in FIGS. 8 through 19 are intended as being suggestive only and are not intended as being limiting.

Figure 8:
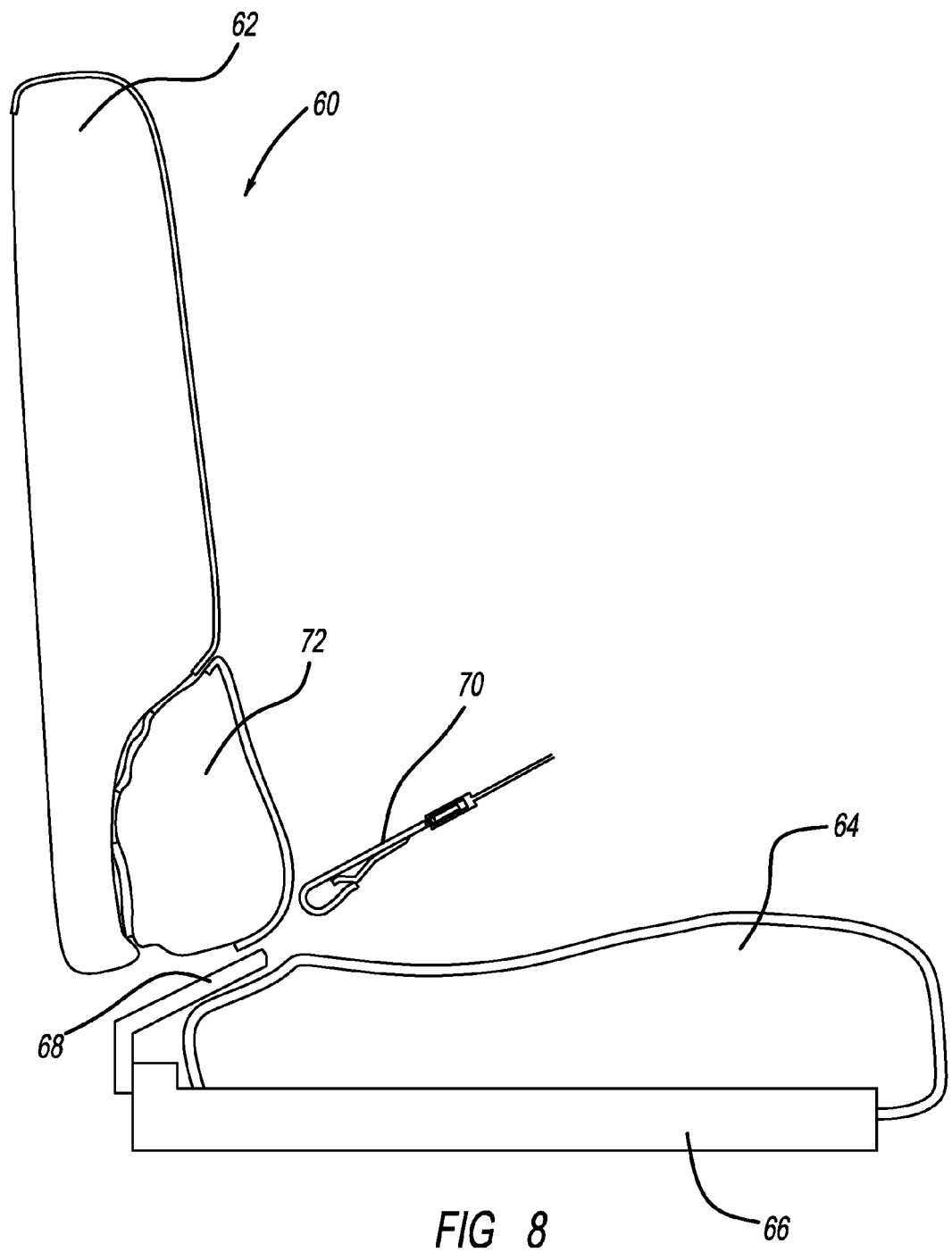
FIG. 8 is a sectional view of a vehicle seat viewed from the side illustrating a removable anchor concealing trim piece according to a first embodiment of the disclosed inventive concept held in by hook-and-loop fasteners.
Figure 9:
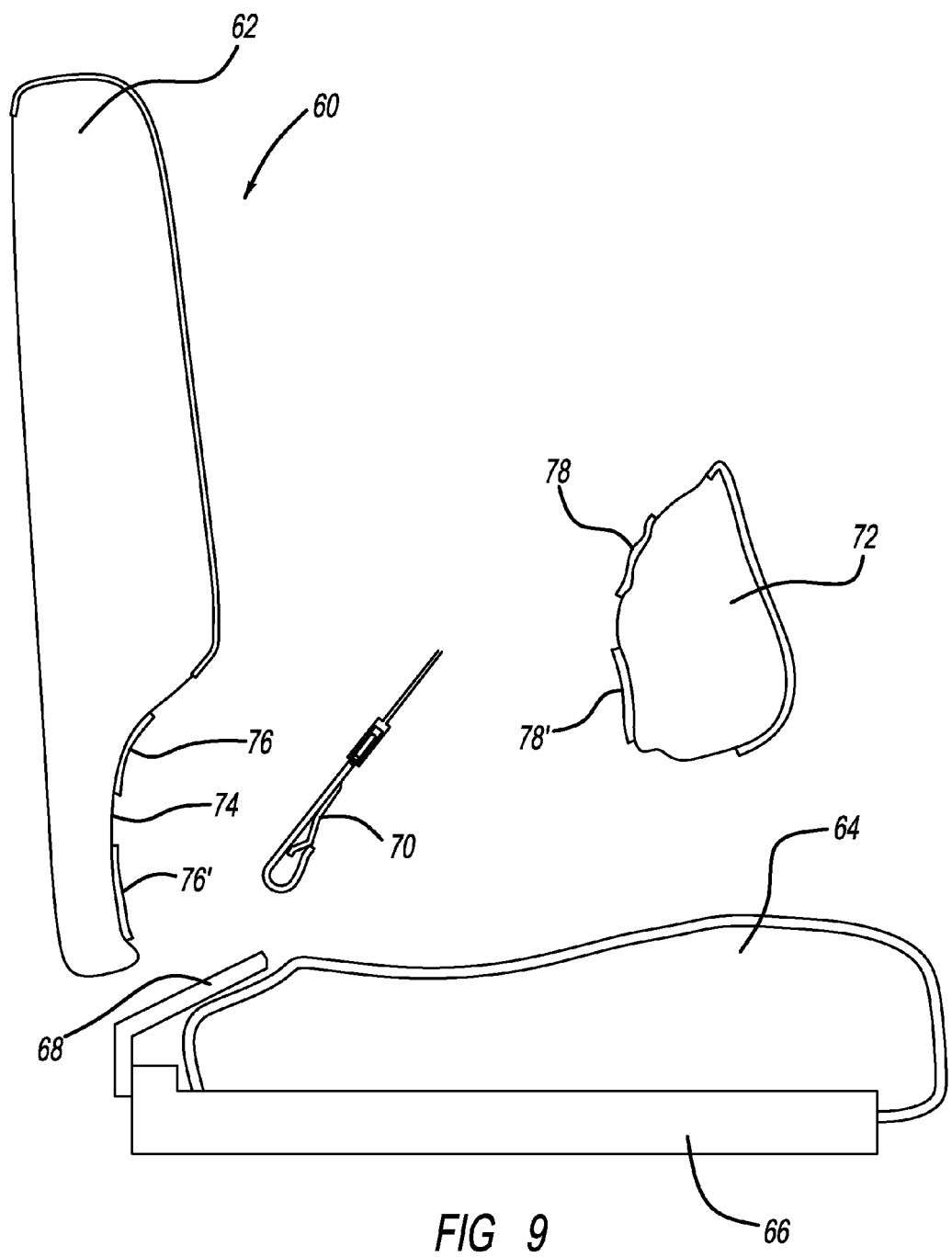
FIG. 9 is a sectional view of a vehicle seat similar to that of FIG. 8 but illustrating the removable anchor concealing trim piece having been removed and shown spaced apart from the seat.

FIGS. 8 and 9 disclose a first embodiment of the disclosed inventive concept. Referring to FIG. 8, a sectional view of a vehicle seat, generally illustrated as 60, is shown. The vehicle seat 60 includes a seat back 62 and a seat base 64 attached to a seat frame 66. CRS anchors, of which one, a CRS anchor 68, is shown, are conventionally provided and are anchored to a portion of the vehicle such as, for example, the seat frame 66. A CRS attachment element such as a web strap and clip 70 is provided for releasable attachment of the CRS (not shown) to the CRS anchor 68.

A concealing trim piece 72 is removably fitted into a trim piece pocket 74. The trim piece pocket 74 may extend below the concealing trim piece 72 and above the CRS anchor 68. The concealing trim piece 72 is releasably held in place by any of several releasable attachment structures, including, without limitation, first portions 76 and 76' and second portions 78 and 78' of a hook-and-loop fastening system. Other releasably attachable arrangements are possible. As a further variation of this and all embodiments of the disclosed inventive concept, the lower portion of the seat back 62 may have one or more openings that allow the consumer to have access to push out the concealing trim piece 72 if desired.

In FIG. 8, the concealing trim piece 72 is shown in its concealing position fitted into the trim piece pocket 74 and held in place by the first portions 76 and 76' and second portions 78 and 78' of the hook-and-loop fastening system. The area where the upper area of the outer surface of the concealing trim piece 72 meets the outer surface of the seat back 62 may be "shingled" for styling reasons, although this arrangement is not illustrated in FIG. 8 or 9.

To reveal the CRS anchor 68, the consumer removes the concealing trim piece 72 as illustrated in FIG. 9 and attachment of the CRS web strap and clip 70 to the CRS anchor 68 is made. Concealment of the CRS anchor 68 may be achieved once the CRS web strap and clip 70 is released by the consumer from the CRS anchor 68 and the concealing trim piece 72 is returned to its concealing position as shown in FIG. 8.

Figure 10:
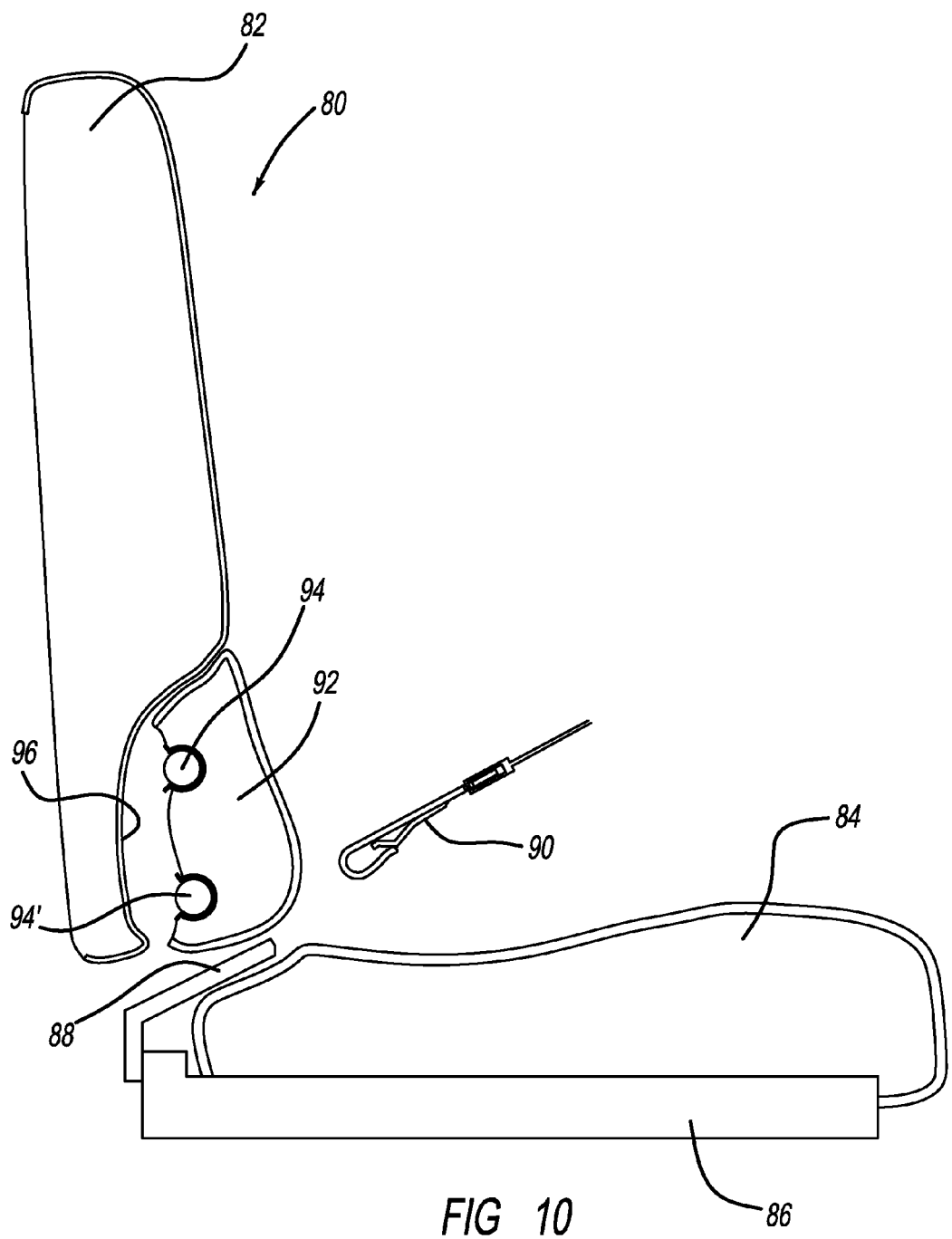
FIG. 10 is a sectional view of a vehicle seat viewed from the side illustrating a removable anchor concealing trim piece according to a second embodiment of the disclosed inventive concept held in by a mechanical interlock feature.
Figure 11:
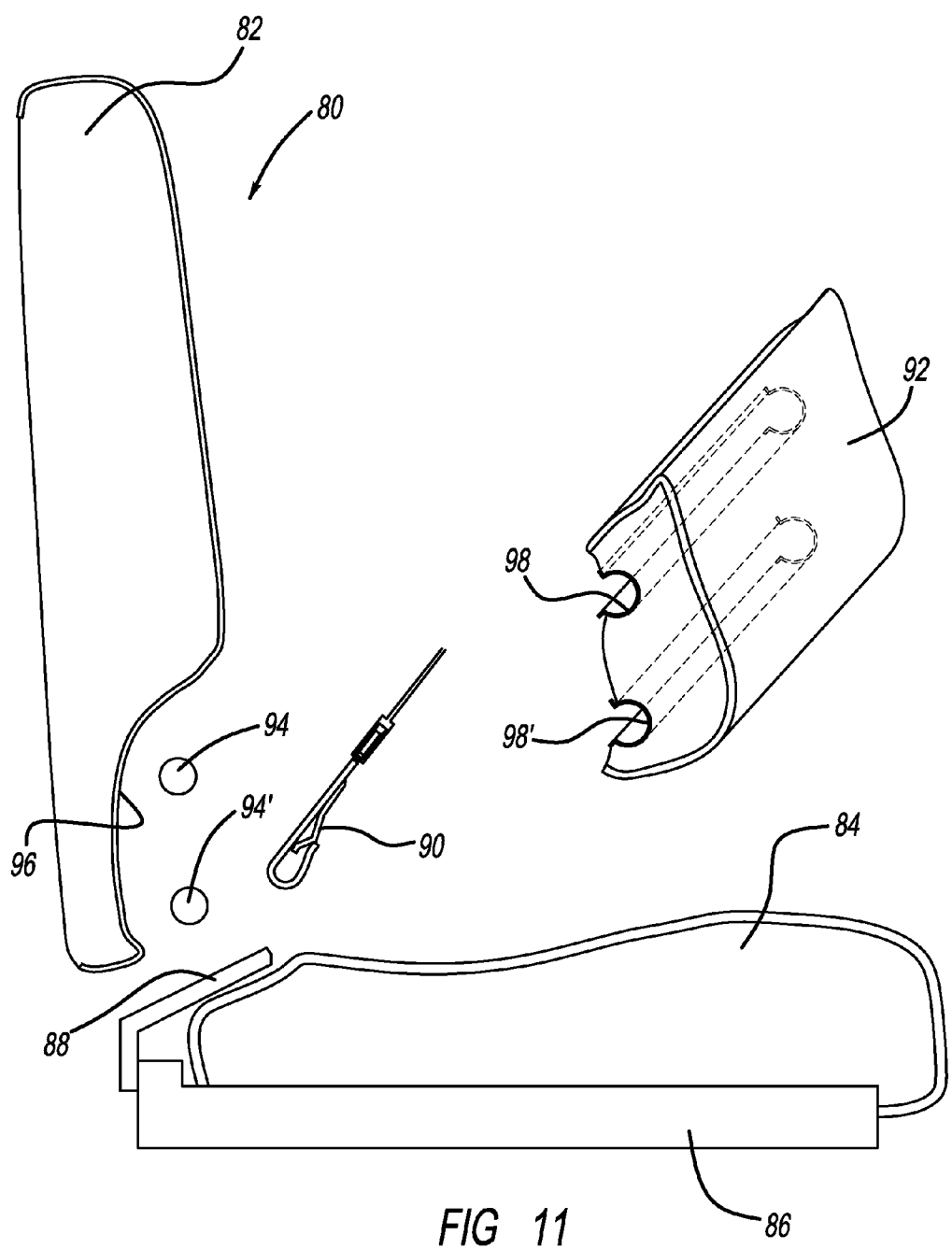
FIG. 11 is a sectional view of a vehicle seat similar to that of FIG. 10 but illustrating the removable anchor concealing trim piece having been removed and shown spaced apart from the seat.

FIGS. 10 and 11 disclose a second embodiment of the disclosed inventive concept. This embodiment provides an alternative to the hook-and-loop fastening system of the first embodiment of the disclosed inventive concept shown in FIGS. 8 and 9 and discussed in relation thereto.

Referring to FIG. 10, a sectional view of a vehicle seat, generally illustrated as 80, is shown. The vehicle seat 80 includes a seat back 82 and a seat base 84 attached to a seat frame 86. CRS anchors, of which one, a CRS anchor 88, is shown, are conventionally provided and are anchored to a portion of the vehicle such as, for example, the seat frame 86. A CRS attachment element such as a CRS web strap and clip 90 is provided for releasable attachment of the CRS (not shown) to the CRS anchor 88.

The concealing trim piece 92 is releasably held in place by the releasable interconnection of the concealing trim piece 92 to a pair of transverse rods 94 and 94' that are either locally embedded in the seat foam of the seat back 82 or are part of the skeleton of the vehicle seat. It is to be understood that while two transverse rods 94 and 94' are shown, a greater or lesser number of transverse rods may be used. A trim piece pocket 96 is formed in the lower portion of the seat back 82.

As illustrated in FIG. 11, a pair of spaced apart channels 98 and 98' is formed in the back side of the concealing trim piece 92. Accordingly, the transverse rods 94 and 94' are releasably locked into the pair of spaced apart channels 98 and 98' to thereby hold the concealing trim piece 92 in the trim piece pocket 96. It is to be understood that while the rods 94 and 94' are illustrated as being transverse, it is possible that the rods could also be oriented vertically.

While in FIG. 10 the concealing trim piece 92 is shown in its concealing position fitted into the trim piece pocket 96 and held in place by the locking interrelationship of the transverse rods 94 and 94' with the channels 98 and 98' having embedded clips (such as C-clips made from a plastic or a metal), to reveal the CRS anchor 88, the consumer removes the concealing trim piece 92 as illustrated in FIG. 11. With the concealing trim piece 92 thus removed, attachment of the CRS web strap and clip 90 to the CRS anchor 88 may be made. Concealment of the CRS anchor 88 may once again be achieved after the CRS web strap and clip 90 is released by the consumer from the CRS anchor 88 and the concealing trim piece 92 is returned to its concealing position as shown in FIG. 10.

Figure 12:
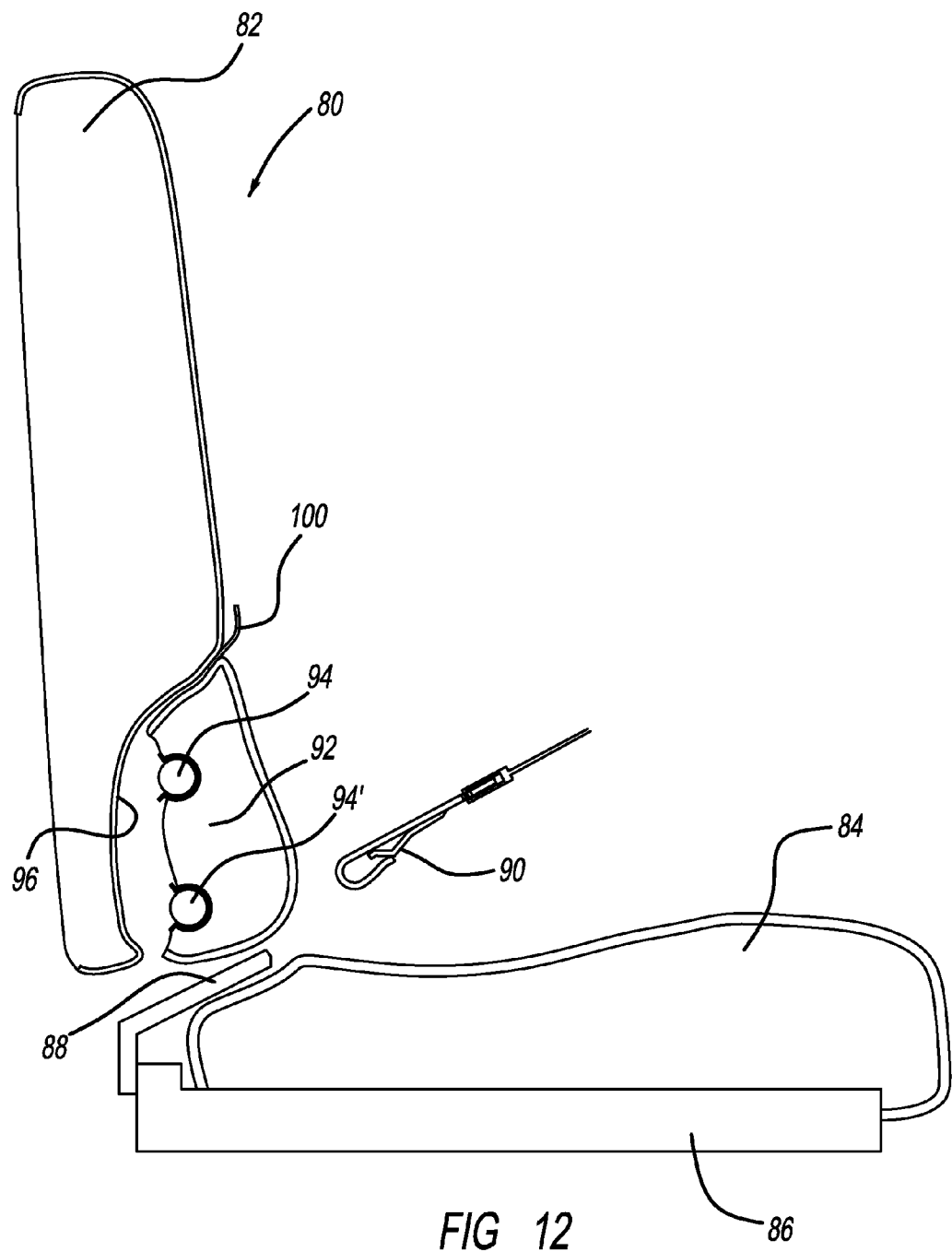
FIG. 12 is a sectional view of a vehicle seat viewed from the side illustrating a removable anchor concealing trim piece according to a variation of the second embodiment of the disclosed inventive concept that includes a release tab attached to the anchor concealing trim piece.
Figure 13:
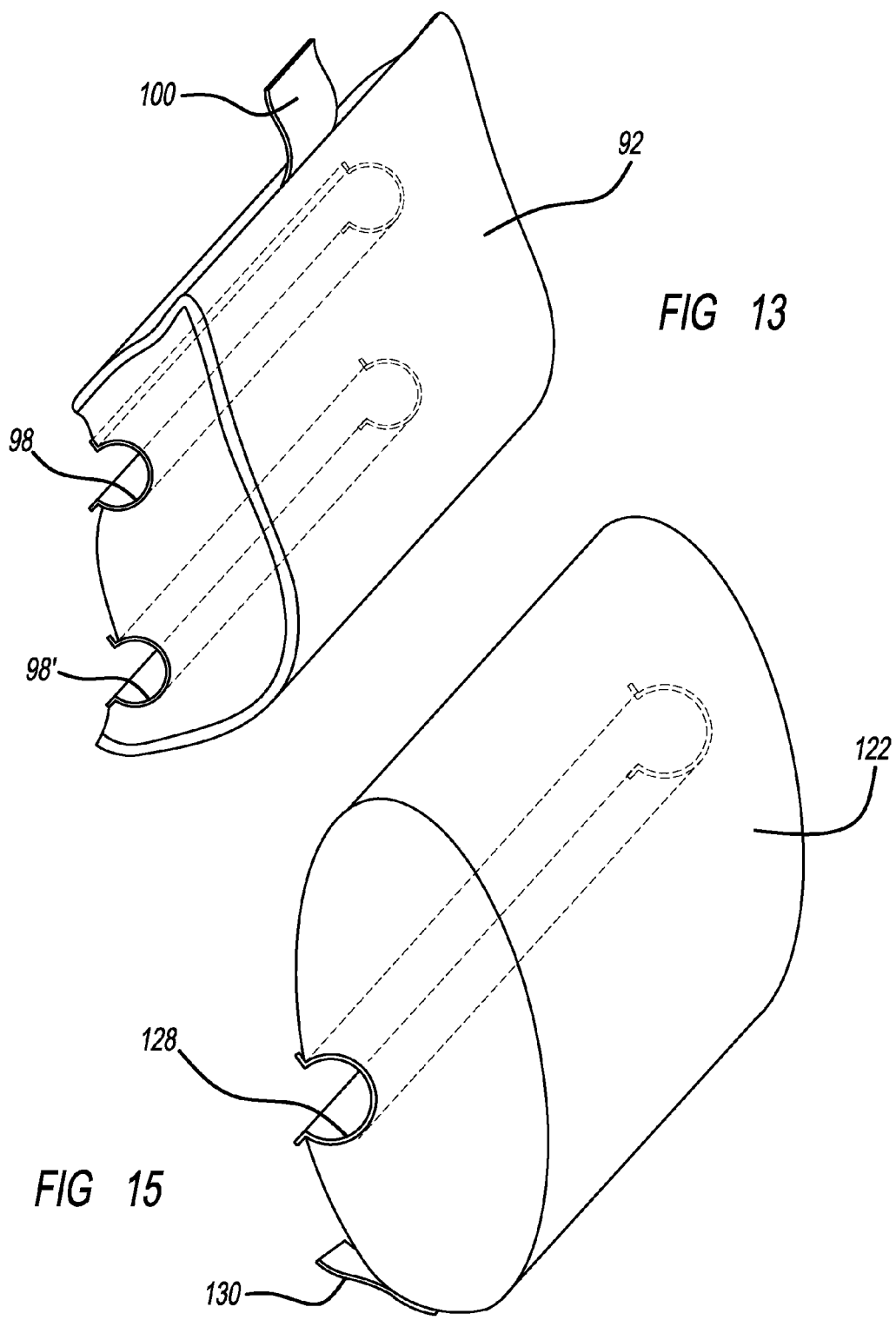
FIG. 13 is a perspective view of the anchor concealing trim piece of the vehicle seat embodiment illustrated in FIG. 12.

A variation of the second embodiment of the disclosed inventive concept is illustrated in FIG. 12 in which the concealing trim piece 92 has a release tab 100. The release tab 100 may include the requisite ISO and may be a cloth tag sewn into concealing trim piece 92 of the type that may be found on various vehicle seats. The release tab 100 may be attached to the concealing trim piece 92 to both identify anchor location and to provide a surface to grab onto to remove the concealing trim piece 92.

The disclosed inventive concept may have further variations related to removability of the concealing trim piece versus rotatability or movability of the concealing trim piece. Particularly, the embodiments shown in FIGS. 14 through 19 provide alternatives to the need for the consumer to remove and store the concealing trim piece as is the case in the embodiments shown in FIGS. 8 through 13.

Figure 14:
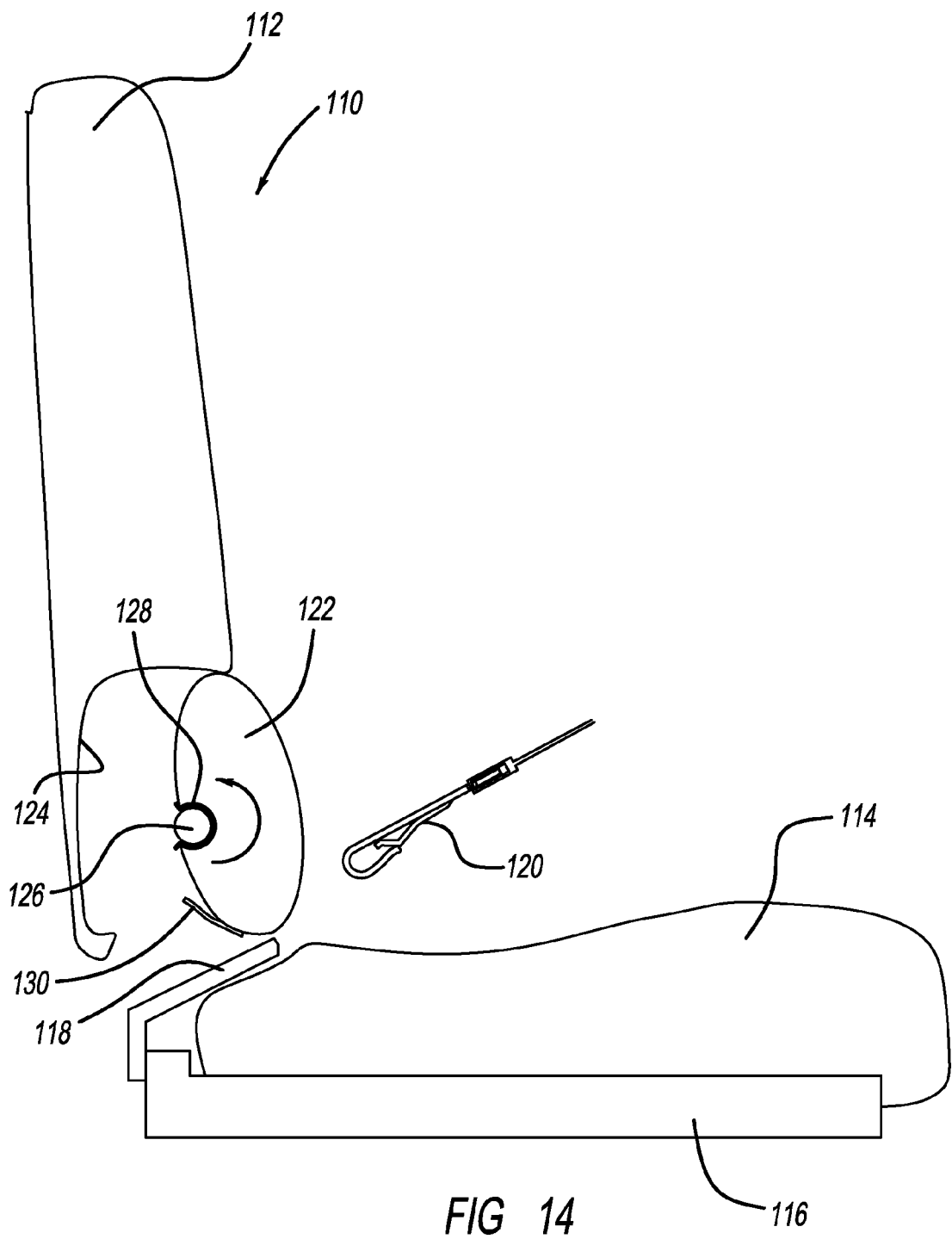
FIG. 14 is a sectional view of a vehicle seat viewed from the side illustrating a rotatable anchor concealing trim piece according to a third embodiment of the disclosed inventive concept in which the rotatable anchor concealing trim piece is rotatable between an anchor concealing position (as shown) and an anchor exposing position (not shown)
Figure 16:
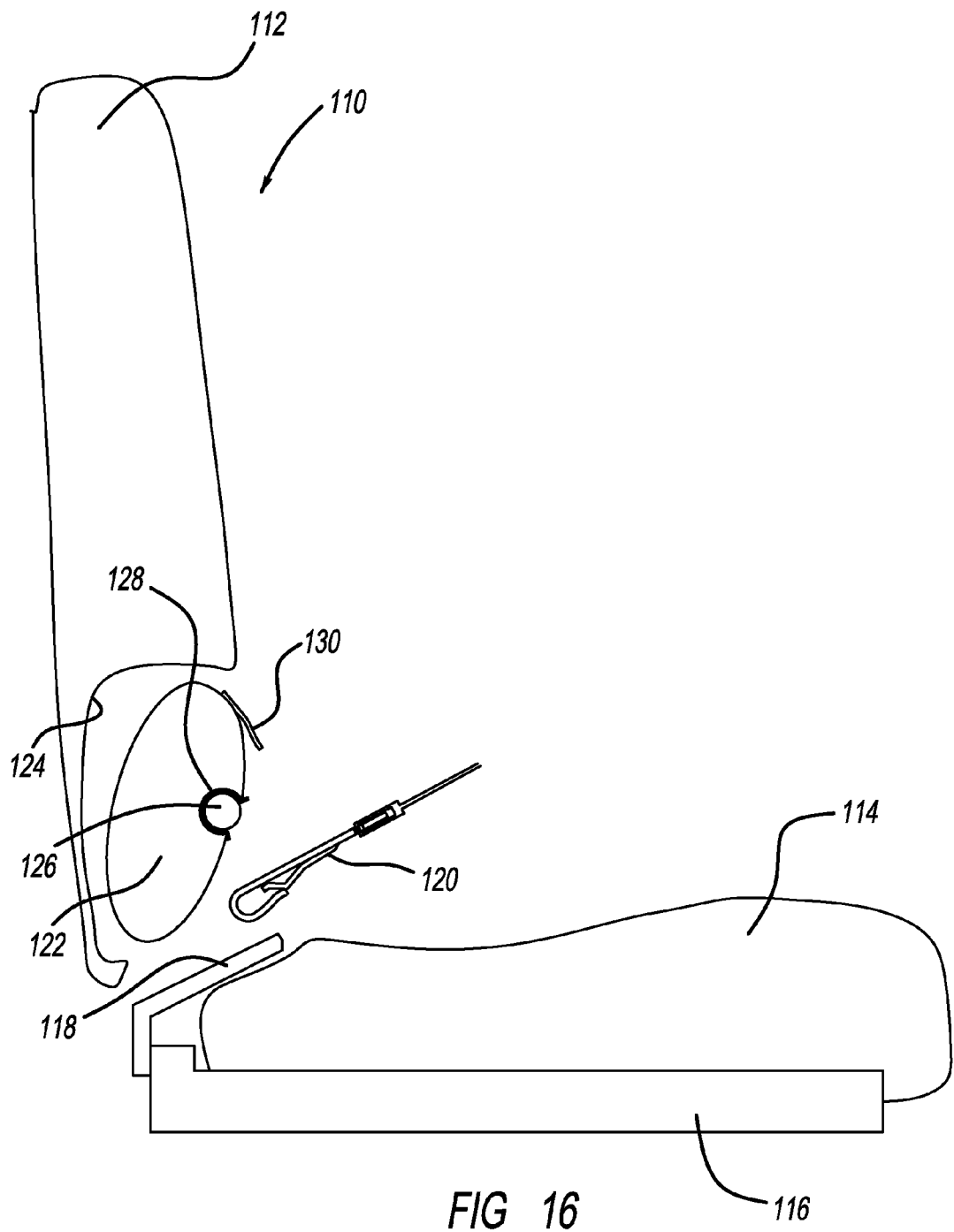
FIG. 16 is a view similar to that of FIG. 14 except the rotatable anchor concealing trim piece is shown rotated to its anchor exposing position.

Referring to FIGS. 14 through 16, a third embodiment of the disclosed inventive concept is illustrated. Referring to FIG. 14, a sectional view of a vehicle seat, generally illustrated as 110, is shown. The vehicle seat 110 includes a seat back 112 and a seat base 114 attached to a seat frame 116. CRS anchors, of which one, a CRS anchor 118, is shown, are conventionally provided and are anchored to a portion of the vehicle such as, for example, the seat frame 116. A CRS attachment element such as a web strap and clip 120 is provided for releasable attachment of the CRS (not shown) to the CRS anchor 118.

A rotatable concealing trim piece 122 is rotatably fitted in a trim piece pocket 124. The trim piece pocket 124 may extend below the rotatable concealing trim piece 122 and above the CRS anchor 118. The rotatable concealing trim piece 122 is rotatably mounted on a transverse rod 128 that is fitted into a channel 128 formed in the rotatable concealing trim piece 122. The channel 128 may be defined by a C-clip or other retention element. The C-clip-lined channel 128 is shown in close-up in FIG. 15. A release tab 130 is preferably attached to the rotatable concealing trim piece 122.

In FIG. 14, the rotatable concealing trim piece 122 is shown in its concealing position rotated to its concealing position in the trim piece pocket 124 such that the CRS anchor 118 is concealed. To reveal the CRS anchor 118, the consumer rotates the rotatable concealing trim piece 122 as illustrated in FIG. 16 and attachment of the CRS web strap and clip 120 to the CRS anchor 118 is made. Concealment of the CRS anchor 118 may be achieved once the CRS web strap and clip 120 is released by the consumer from the CRS anchor 118 and the rotatable concealing trim piece 122 is rotated back to its concealing position as shown in FIG. 14.

Figure 17:
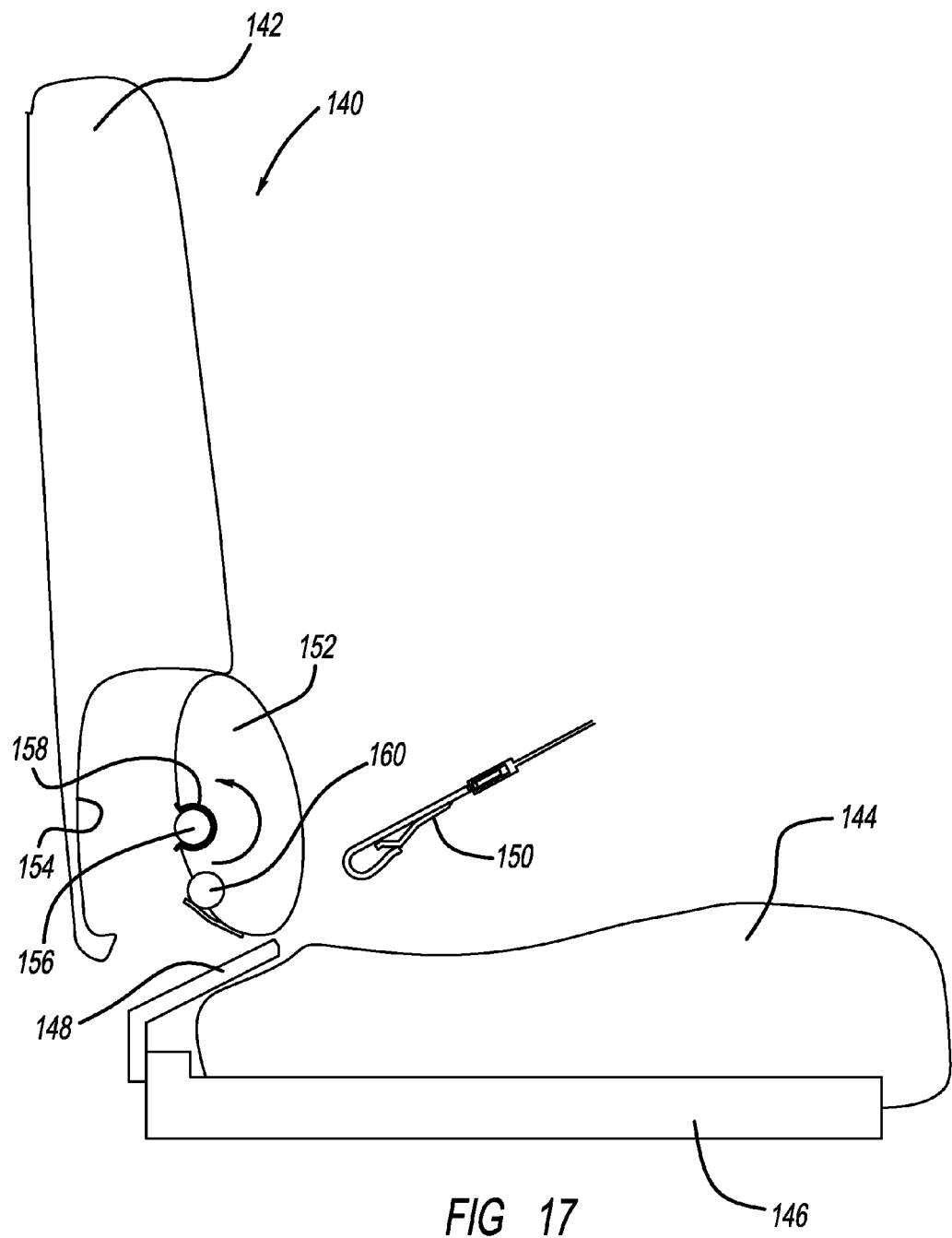
FIG. 17 is a sectional view of a vehicle seat viewed from the side illustrating a rotatable anchor concealing trim piece according to a fourth embodiment of the disclosed inventive concept in which a rotatable anchor concealing trim piece is provided that may be locked in position against unintended rotation.

A variation of the third embodiment of the disclosed inventive concept illustrated in FIGS. 14 through 16 and discussed in relation thereto is a fourth embodiment of the disclosed inventive concept illustrated in FIG. 17. Referring thereto, a sectional view of a vehicle seat, generally illustrated as 140, is shown. The vehicle seat 140 includes a seat back 142 and a seat base 144 attached to a seat frame 146. CRS anchors, of which one, a CRS anchor 148, is shown, are conventionally provided and are anchored to a portion of the vehicle such as, for example, the seat frame 146. A CRS attachment element such as a web strap and clip 150 is provided for releasable attachment of the CRS (not shown) to the CRS anchor 148.

A rotatable concealing trim piece 152 is rotatably fitted in a trim piece pocket 154. The rotatable concealing trim piece 152 is rotatably mounted on a transverse rod 156 that is fitted into a channel 158 formed in the rotatable concealing trim piece 152. The channel 158 may be defined by a C-clip or other retention element.

The fourth embodiment of the disclosed inventive concept differs from the third embodiment in that a positive stop is provided to prevent unintended rotation of the rotatable concealing trim piece 152 about the transverse rod 156. The positive stop is provided in the form of a second transverse rode 160 against which the rotatable concealing trim piece 152 rests when in its concealing position as illustrated in FIG. 17.

Figure 18:
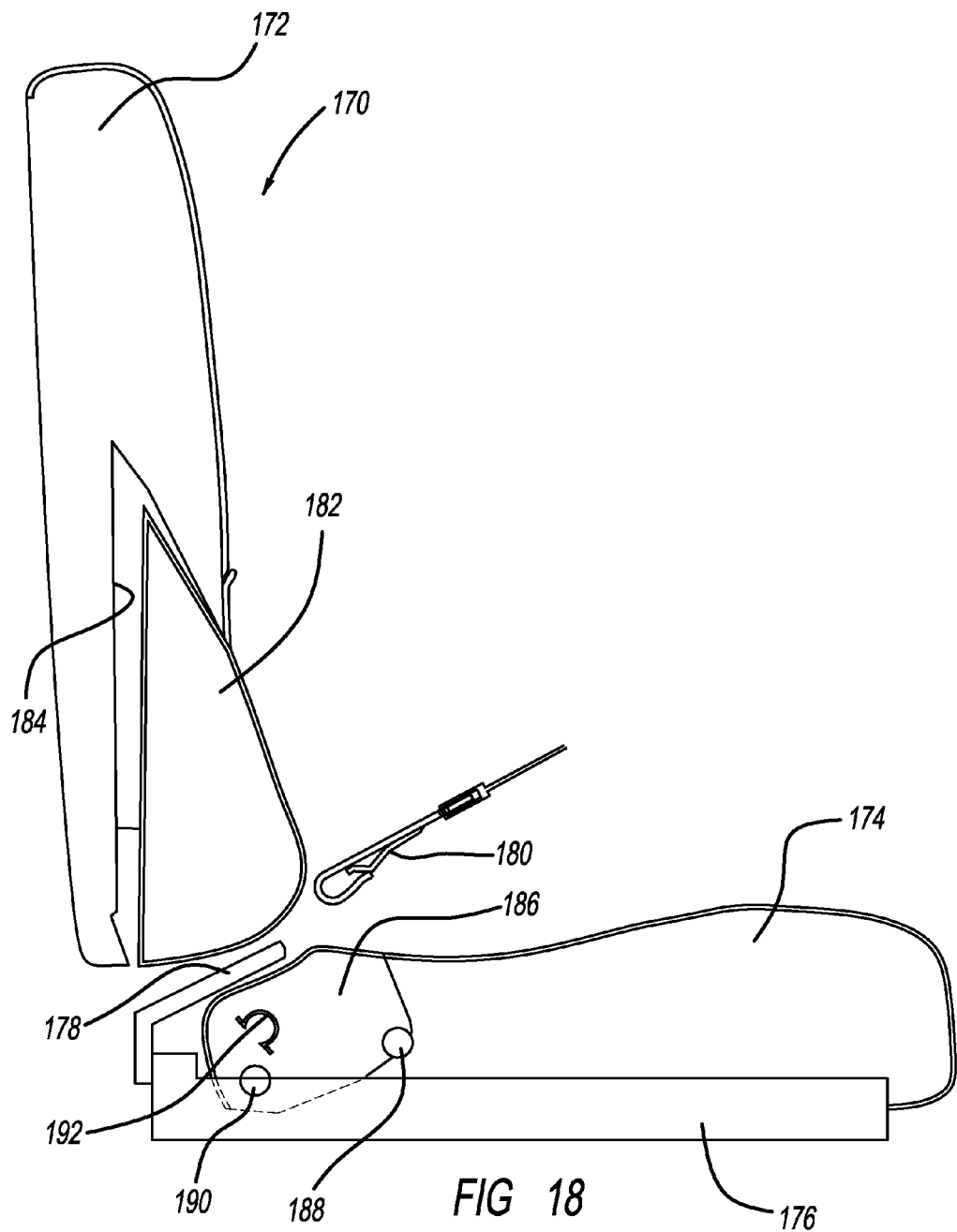
FIG. 18 is a sectional view of a vehicle seat viewed from the side illustrating a rotatable anchor concealing trim piece according to a fifth embodiment of the disclosed inventive concept in which a slidable anchor concealing trim piece is movable between an anchor concealing position (as shown) and an anchor exposing position (not shown)

A fifth embodiment of the disclosed inventive concept is illustrated in FIGS. 18 and 19. Like the third and fourth embodiments discussed above in relation to FIGS. 14 through 17, the fifth embodiment requires only movement and not removal of the concealing trim piece to reveal the CRS anchor.

Referring to FIG. 18, a sectional view of a vehicle seat, generally illustrated as 170, is shown. The vehicle seat 170 includes a seat back 172 and a seat base 174 attached to a seat frame 176. CRS anchors, of which one, a CRS anchor 178, is shown, are conventionally provided and are anchored to a portion of the vehicle such as, for example, the seat frame 176. A CRS attachment element such as a web strap and clip 180 is provided for releasable attachment of the CRS (not shown) to the CRS anchor 178.

A slidable concealing trim piece 182 is slidably positioned in a slidable trim piece pocket 184. The slidable trim piece pocket 184 may be of any shape including the shape illustrated. The slidable trim piece pocket 184, which may be a friction contact path, allows the slidable concealing trim piece 182 to be moved upwards into the seat back 172.

In addition, a rearward-positioned portion of the seat base 174 may be movable to allow greater access to the CRS anchor 178. This portion, a rotating concealing trim piece 186, rotates on an optional pivot rod 188. An attachment rod 190 is provided. A C-clip 192 is preferably fitted to the rotating concealing trim piece 186. In their concealing positions as illustrated in FIG. 18, the slidable concealing trim piece 182 is moved downward and the rotating concealing trim piece 186 remains in its raised position.

If the consumer desires to have access to the CRS anchor 178, the slidable concealing trim piece 182 is moved upward into the seat back 172 and the rotating concealing trim piece 186 is rotated downward until the attachment rod 190 locks into the C-clip 192 as illustrated in FIG. 19.

The system for concealing a CRS anchor according to the disclosed inventive concept may be employed in any vehicle seat conventionally fitted with a CRS anchor. While specific locations of the CRS anchor have been illustrated in the figures and described in relation thereto, it is to be understood that the CRS anchors may be provided in locations other than those shown and described. However, the concealing trim piece of the disclosed inventive concept would find application regardless of the location of the CRS anchors.

One skilled in the art will readily recognize from such discussion, and from the accompanying drawings and claims that various changes, modifications and variations can be made therein without departing from the true spirit and fair scope of the invention as defined by the following claims.

What is claimed is:

1. A system for selectively concealing a child safety seat anchor in a vehicle, the system comprising:
   a seat;
   a seat anchor;
   a concealing trim piece pocket having a back wall formed in said seat; and
   a concealing trim piece having a front wall, said piece being rotatable attached to said seat, said piece being movable between an anchor concealing position in which said front wall faces away from said back wall and an anchor revealing position in which said front wall faces said back wall.

2. The system for selectively concealing a child safety seat anchor in a vehicle of claim 1 wherein said concealing trim piece is a removable piece, the system further including hook-and-loop fasteners for attaching said removable piece to said seat.

3. The system for selectively concealing a child safety seat anchor in a vehicle of claim 1 further including a rod fixed to said seat and wherein said trim piece includes a channel for releasable attachment to said rod.

4. The system for selectively concealing a child safety seat anchor in a vehicle of claim 3 wherein said channel includes a C-clip.

5. The system for selectively concealing a child safety seat anchor in a vehicle of claim 1 further including a consumer-manipulated tab attached to said concealing trim piece.

6. The system for selectively concealing a child safety seat anchor in a vehicle of claim 1 further including a rod fixed to said seat and wherein said concealing trim piece is rotatably attached to said rod, said concealing trim piece being rotatable between an anchor concealing position and an anchor revealing position.

7. The system for selectively concealing a child safety seat anchor in a vehicle of claim 6 wherein said seat further includes a positive stop structure that limits rotation of said concealing trim piece.

8. The system for selectively concealing a child safety seat anchor in a vehicle of claim 1 wherein said concealing trim piece comprises a slidably movable concealing trim piece and said rotatably movable concealing trim piece.

9. The system for selectively concealing a child safety seat anchor in a vehicle of claim 8 wherein said seat includes a seat back and a seat base and wherein concealing trim piece pocket is formed in said seat back, said slidably movable concealing trim piece being slidably positioned in said concealing trim piece pocket.

10. A system for selectively concealing a child safety seat anchor in a vehicle, the system comprising:
   a seat;
   a seat anchor;
   a concealing trim piece pocket having a back wall formed in said seat; and
   a concealing trim piece having a front wall, said piece being rotatably movable between a position in which said front wall faces away from said back wall and a position in which said front wall faces said back wall.

11. The system for selectively concealing a child safety seat anchor in a vehicle of claim 10 wherein said concealing trim piece is removably attached to said seat.

12. The system for selectively concealing a child safety seat anchor in a vehicle of claim 11 further including hook-and-loop fasteners for attaching said concealing trim piece to said seat.

13. The system for selectively concealing a child safety seat anchor in a vehicle of claim 10 further including a rod fixed to said seat and wherein said concealing trim piece includes a channel for releasable attachment to said rod.

14. The system for selectively concealing a child safety seat anchor in a vehicle of claim 13 wherein said channel includes a C-clip.

15. The system for selectively concealing a child safety seat anchor in a vehicle of claim 13 further including a consumer-manipulated tab attached to said concealing trim piece.

16. The system for selectively concealing a child safety seat anchor in a vehicle of claim 10 further including a rod fixed to said seat and wherein said concealing trim piece is rotatably attached to said rod, said concealing trim piece being rotatable between an anchor concealing position and an anchor revealing position.

17. The system for selectively concealing a child safety seat anchor in a vehicle of claim 16 wherein said seat further includes a positive stop structure that limits rotation of said concealing trim piece.

18. The system for selectively concealing a child safety seat anchor in a vehicle of claim 10 wherein said concealing trim piece comprises a slidably movable concealing trim piece and said rotatably movable concealing trim piece.

19. The system for selectively concealing a child safety seat anchor in a vehicle of claim 18 wherein said seat includes a seat back and a seat base and wherein concealing trim piece pocket is formed in said seat back, said slidably movable concealing trim piece being slidably positioned in said concealing trim piece pocket.

20. A seat for a vehicle comprising:
   a seat back
   a seat base;
   a safety seat attachment anchor;
   a concealing trim piece pocket having a back wall formed in said seat; and
   a concealing trim piece having a front wall, said piece being rotatably movable between an anchor concealing position in which said front wall faces away from said back wall and an anchor revealing position in which said front wall faces said back wall.

* * * * *